United States Patent
De Ruijter et al.

(10) Patent No.: US 10,911,129 B1
(45) Date of Patent: Feb. 2, 2021

(54) SYSTEM, APPARATUS AND METHOD FOR PERFORMING ANTENNA DIVERSITY SELECTION BASED ON MULTI-SYMBOL CORRELATIONS

(71) Applicant: Silicon Laboratories Inc., Austin, TX (US)

(72) Inventors: Hendricus De Ruijter, Austin, TX (US); Antonio Torrini, Austin, TX (US); Yan Zhou, Spicewood, TX (US); David Trager, Buda, TX (US)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 16/711,824

(22) Filed: Dec. 12, 2019

(51) Int. Cl.
*H04B 7/10* (2017.01)
*H04B 7/08* (2006.01)
*H04B 17/318* (2015.01)

(52) U.S. Cl.
CPC .......... *H04B 7/0871* (2013.01); *H04B 7/088* (2013.01); *H04B 7/0814* (2013.01); *H04B 7/0857* (2013.01); *H04B 7/0874* (2013.01); *H04B 7/0888* (2013.01); *H04B 17/318* (2015.01)

(58) Field of Classification Search
CPC .. H04B 7/0871; H04B 7/0888; H04B 7/0857; H04B 7/0874; H04B 7/0814; H04B 7/088; H04B 17/318
USPC ...................................................... 375/347
See application file for complete search history.

(56) References Cited

U.S. PATENT DOCUMENTS

| | | | |
|---|---|---|---|
| 9,184,824 B1 * | 11/2015 | Wu ......................... | H04L 27/08 |
| 2001/0004378 A1 * | 6/2001 | Takeuchi ............... | H04B 1/708 375/148 |
| 2004/0179495 A1 * | 9/2004 | Ramakrishnan ..... | H04B 7/0808 370/334 |
| 2012/0269083 A1 * | 10/2012 | Kamerman .......... | H04B 7/0811 370/252 |
| 2016/0065295 A1 * | 3/2016 | Stanescu .............. | H04B 7/0814 375/133 |

OTHER PUBLICATIONS

Silicon Labs, "Datasheet: ZM5101 Fully Integrated Z-Wave® Wireless System-in-Package," Mar. 2018, 47 pages.
(Continued)

*Primary Examiner* — Don N Vo
(74) *Attorney, Agent, or Firm* — Trop, Pruner & Hu, P.C.

(57) ABSTRACT

In one embodiment, an apparatus includes: an antenna switch to receive a first radio frequency (RF) signal from a first antenna and a second RF signal from a second antenna and controllable to output a selected one of the first and second RF signals; an RF circuit to receive and process the first and second RF signals; at least one mixer to downconvert the first and second RF signals to first and second baseband signals; and an antenna diversity control circuit to receive sub-symbol portions of a first plurality of symbols of the first baseband signal and sub-symbol portions of a second plurality of symbols of the second baseband signal, and control the antenna switch to output one of the first and second RF signals, based at least in part on one or more of the sub-symbol portions of the first and second pluralities of symbols.

20 Claims, 9 Drawing Sheets

(56) References Cited

OTHER PUBLICATIONS

Raoul Wijgergangs, "Z-Wave to IP Software/Firmware Bridges the Worlds of Z-Wave and IoT," at least as early as Dec. 1, 2018, 6 pages.
Silicon Labs, "Z-Wave FLiRS:Enabling Wireless Smart Door Locks and Thermostat," at least as early as Dec. 1, 2018, 4 pages.
U.S. Appl. No. 16/225,562, filed Dec. 19, 2018, entitled "System, Apparatus And Method For Concurrent Reception Of Multiple Channels Spaced Physically In Radio Frequency Spectrum," by Jacob Pihl, et al.

* cited by examiner

SYSTEM, APPARATUS AND METHOD FOR PERFORMING ANTENNA DIVERSITY SELECTION BASED ON MULTI-SYMBOL CORRELATIONS

BACKGROUND

In radio systems with antenna diversity (multiple antennas), selecting the optimal antenna to use at runtime without any a priori knowledge can lead to signal impairments, computation complexity and poor system performance. One known antenna selection technique is to periodically change the antenna to receive a signal and try to detect a preamble within a selection period using a signal as received by one of the antennas. After a preamble is detected, the other antenna will be selected so that an antenna diversity algorithm can make a decision to select the best antenna based on the measurements of both antennas. A first preamble detection may fail if the selected first antenna is positioned in a signal null. The preamble may be detected on the second antenna in the second preamble detection period. In that case the receiver has to switch back to the first antenna and make a decision on which antenna to use for the remainder of the packet. Such operation limits the available selection period and hence the receive sensitivity.

Because the preamble time for each packet is limited, so too is the time that can be used for each antenna, or else packets may be missed altogether if they appear during the time that the worst antenna is active. This limited selection time forces use of less accurate and time efficient methods of detection.

In other words, situations result where there are numerous false detects in order to avoid missing packets, but false detects too can have a large negative impact. The net result is that key system performance will not be as good as if the best antenna were manually selected each time, and often performance is many decibels away from a desired operating level.

SUMMARY OF THE INVENTION

In one aspect, an apparatus includes: an antenna switch to receive a first radio frequency (RF) signal from a first antenna and a second RF signal from a second antenna, and controllable to output a selected one of the first and second RF signals; an RF circuit to receive and process the first and second RF signals; at least one mixer to downconvert the first and second RF signals to first and second baseband signals; and an antenna diversity control circuit to receive sub-symbol portions of a first plurality of symbols of the first baseband signal and sub-symbol portions of a second plurality of symbols of the second baseband signal. This antenna diversity control circuit may control the antenna switch to output the selected one of the first RF signal and the second RF signal for a packet communication, based at least in part on one or more of the sub-symbol portions of the first plurality of symbols of the first baseband signal and the sub-symbol portions of the second plurality of symbols of the second baseband signal.

In an embodiment, the antenna diversity control circuit comprises a memory to store the sub-symbol portions of the first plurality of symbols of the first baseband signal and the sub-symbol portions of the second plurality of symbols of the second baseband signal. The antenna diversity control circuit may include a configuration register to store configuration information comprising chip masking information and blackout information. Based at least in part on the chip masking information, the antenna diversity control circuit may receive a contiguous set of chips from the first plurality of symbols comprising a first set of chips from a first symbol and a second set of chips from a second symbol, the first set of chips and the second set of chips each less than a full set of chips of the first symbol and the second symbol. The antenna diversity control circuit may include a correlator to correlate the sub-symbol portions of the first plurality of symbols with a preamble value to output a first correlator result and correlate the sub-symbol portions of the second plurality of symbols with the preamble value to output a second correlator result. The apparatus may further include a received signal strength indicator (RSSI) circuit to calculate RSSI information of the first baseband signal. The antenna diversity control circuit further comprises a summer to generate a sum associated with the first baseband signal based on the first correlator result and the RSSI information. The antenna diversity control circuit may select the first antenna when the sum associated with the first baseband signal is greater than a sum associated with the second baseband signal. The summer may generate a weighted sum associated with the first baseband signal based on the first correlator result and the RSSI information. The antenna diversity control circuit may identify an antenna lock state within at least part of a preamble and sync word portion of the packet communication.

In another aspect, a method includes: storing sub-symbol portions of a first plurality of symbols received from a first antenna in a first correlation buffer of a wireless receiver; storing sub-symbol portions of a second plurality of symbols received from a second antenna in a second correlation buffer of the wireless receiver; correlating the sub-symbol portions of the first plurality of symbols with an expected preamble value to obtain a first correlation result; correlating the sub-symbol portions of the second plurality of symbols with the expected preamble value to obtain a second correlation result; and controlling an antenna switch of the wireless receiver to provide RF signals from the first antenna for at least one packet communication, based at least in part on the first correlation result.

In an embodiment, the method further comprises controlling the antenna switch to provide the RF signals from the first antenna for the at least one packet communication, further based on the second correlation result. The method may further include storing the sub-symbol portions of the first plurality of symbols formed of a contiguous set of chips of the first plurality of symbols, the contiguous set of chips comprising a first set of chips from a first symbol of the first plurality of symbols and a second set of chips from a second symbol of the first plurality of symbols. The contiguous set of chips of the first plurality of symbols may include sub-symbol portions of the first plurality of symbols of a preamble of the at least one packet communication. The method may further include controlling the antenna switch to switch between the first antenna and the second antenna and then to lock onto the first antenna during a preamble portion of the at least one packet communication. The method may further include aborting the lock onto the first antenna in response to one or more abort conditions.

In yet another aspect, a system includes: a first antenna to receive first RF signals; a second antenna to receive second RF signals; an antenna switch to receive the first and second RF signals and controllable to output a selected one of the first RF signals and the second RF signals; an RF circuit to receive and process the first and second RF signals; at least one mixer to downconvert the first and second RF signals to first and second baseband signals; and an antenna diversity control circuit to receive sub-symbol portions of a first plurality of symbols of the first baseband signal and sub-symbol portions of a second plurality of symbols of the second baseband signal. The antenna diversity control circuit may be configured to determine, within a preamble portion of a packet communication, to lock onto the first antenna, based at least in part on a first correlation result obtained from the sub-symbol portions of the first plurality of symbols of the first baseband signal.

In an embodiment, the antenna diversity control circuit comprises a multi-symbol correlator to generate the first correlation result. The antenna diversity control circuit may further include a single symbol correlator to generate single symbol correlation results, where the antenna diversity control circuit is to abort the lock onto the first antenna based on the single symbol correlation results. The antenna diversity control circuit may be configured to obtain the sub-symbol portions of the first plurality of symbols comprising a contiguous set of chips of the first plurality of symbols, the contiguous set of chips comprising a first set of chips from a first symbol of the first plurality of symbols, a second set of chips from a second symbol of the first plurality of symbols, and a third set of chips from a third symbol of the first plurality of symbols.

DETAILED DESCRIPTION

Figure 1:
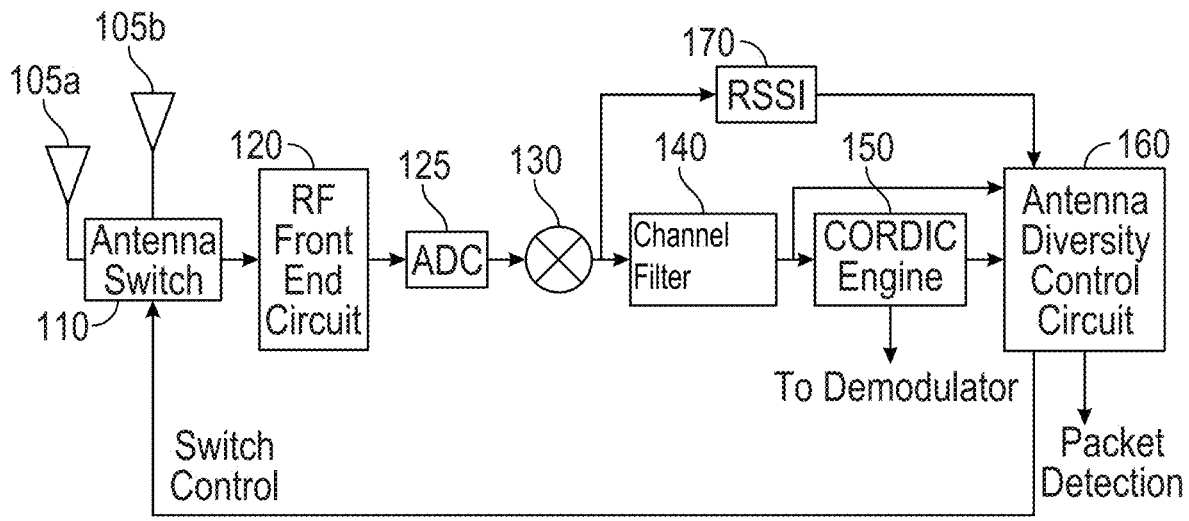
FIG. 1 is a block diagram of a wireless receiver in accordance with an embodiment.

In various embodiments, a wireless receiver having an antenna diversity arrangement may provide for efficient and fast dynamically determined selection of a most appropriate antenna for reception of an incoming communication. To this end, the wireless receiver may include an antenna diversity control circuit that is configured to control an antenna switch to selectively switch between inputs from the different antennas. With this selective switching, information of multiple symbols may be obtained from the different antennas. More particularly, contiguous information of different symbols may be controllably pieced together to enable processing of information from multiple symbols in a manner that avoids transients and other issues resulting from switching between the antennas.

Embodiments may be applicable to a variety of wireless communication techniques. However, for purposes of discussion a packet-based communication system is described. One representative packet-based communication system is a communication protocol in accordance with the IEEE 802.15.4-based standard such as a Zigbee communication protocol. In a Zigbee communication protocol, a packet communication begins with a known preamble that is followed by message information. With embodiments herein, during the preamble portion of a communication, an antenna diversity selection may be made using information from multiple symbols received during the preamble. And more particularly as described herein, sub-symbol portions of multiple symbols from a given antenna may be pieced or stitched together to form a contiguous sequence of symbols. As used herein, the term "sub-symbol portion" is a sequence of contiguous set of chips shorter than a symbol period and may cover a part of one symbol or cover a last part of one symbol and a first part of a succeeding symbol. After this process to combine sub-symbol portions from multiple symbols into a contiguous sequence of symbols, a multi-symbol correlator may be used to generate a multi-symbol correlation result from these combined sub-symbol portions, as described further herein. The evaluation of the correlation results can happen after every received sub-symbol, which is much more frequent as compared to classic methods, which improves the time efficiency.

Thus in an implementation for use for a Zigbee-based communication protocol or other protocols, a preamble-based detection scheme may be used. More particularly, Zigbee has a packet preamble composed by 8 symbols, each 32 chips, with each symbol having a predetermined value (namely 0x0H). After these preamble symbols a syncword is sent that may include two symbols, e.g., namely 0x7H and 0xAH. Thus in Zigbee, the known pattern length is 10 symbols (40 bits). By switching antennas on a sub-symbol frequency and digitally recombining buffers for each antenna, the multi-symbol correlators may be used for enhanced detection precision. Thanks to digital recombination, there is more symbol information available than traditional diversity methods which helps to make correct decisions in the antenna diversity algorithm. In addition, correlation results may be evaluated each time an antenna switch occurs, resulting in a very fast response time that minimizes the chance of ever running out of preamble symbols, and eliminates or at least minimizes impacts of transients resulting from the switching. Also, the correlator output for each antenna can be supplemented with signal metric information for better antenna selection precision.

In different situations, an antenna may be selected within the preamble portion only or using the additional known pattern information (sync word). The correlation may be made on arbitrary constructions of sub-symbols (not necessarily contiguous sequences from the symbol alphabet). In some cases, timing information from a previous selection of an antenna may be used to speed up ultimate timing synchronization. By using precisely controlled switching (both at antenna and selection of samples used in correlation), when switching back to the good antenna, known timing alignment may be used. This could be useful in cases where the preamble may run out.

In some cases, antenna diversity may also use symbol identifiers. When making use of extended preamble symbol information (e.g., 10 preamble symbols) for antenna diversity application, the antenna diversity and symbol identifier can potentially co-exist. This symbol identifier may use a minimum of two symbols duration for random Zigbee symbol identification. The two antennas are switched at 2-symbol intervals to accommodate symbol identifier requirement. After switching (e.g.,) three times, the antenna with higher signal strength can be determined. After consuming 6 preambles to select the best antenna, there are still 4 symbol left for frequency and phase tracking. Since the signal gap period is random and the antenna switching is at 2-symbol interval, the above approach may work best with a gap of greater than 4 symbol durations.

Referring now to FIG. 1, shown is a block diagram of a wireless receiver in accordance with an embodiment. As shown in FIG. 1, receiver 100 includes multiple antennas 105a,b. Although two antennas are shown for ease of illustration, understand that additional antennas may be present in certain cases. As will be described herein, for a given wireless communication, e.g. a given packet communication, one of antennas 105 may be selected for use based at least in part on information determined in an antenna diversity control circuit 160.

In embodiments herein, an antenna switch 110 may be controlled to selectively pass an RF signal from one of antennas 105 in response to switch control signals received from antenna diversity control circuit 160. Antenna switch 105 may be discrete or integrated. To determine which antenna to select, RF signals from the multiple antennas may be passed and processed. More specifically, RF signals are passed via antenna switch 110, according to antenna switch control signals received from antenna diversity control circuit 160. In embodiments herein, antenna switch 110, during an antenna diversity determination, may be controlled to selectively switch between antennas 105 multiple times, each for a given time duration referred to herein as an antenna slot.

These RF signals, each associated with a given antenna slot, are provided to an RF front end circuit 120. RF front end circuit 120 may include various components, including gain control circuitry such as a low noise amplifier and one or more additional gain control stages, filters and so forth to receive and process incoming RF signals. Resulting signals, potentially after down conversion to a lower frequency signal, may be provided as analog signals to an analog-to-digital converter (ADC) 125, which digitizes the signals and provides them to a mixer 130, which down converts them to a lower frequency, e.g., baseband, using a mixing signal (not shown for ease of illustration in FIG. 1). Mixer 130 may be implemented as a complex mixer to output in-phase and quadrature signals to a channel filter 140. In addition, the digitized signals are provided to a received signal strength indicator (RSSI) circuit 170, which may determine signal metrics such as RSSI information from the received signals.

As further shown, complex baseband signals are provided to a coordinate rotation digital computer (CORDIC) engine, which may determine phase information based on the incoming signals. As seen, for further processing of the received signals, they are provided from CORDIC engine 150 to a demodulator, which performs demodulation operations according to a given modulation scheme. Thereafter, demodulated signals may be provided to further circuitry of wireless receiver 100, such as a decoder or so forth. In other cases a demodulator may use IQ samples directly, depending on demodulation mode.

As further shown in FIG. 1, the phase difference signals determined in CORDIC engine 150 may be provided to antenna diversity control circuit 160. In addition, antenna diversity control circuit 160 may further receive the baseband signals themselves directly from IQ generator 140. In addition, antenna diversity control circuit 160 also receives RSSI information from RSSI circuit 170. As will be described herein, antenna diversity control circuit 160 may be configured to determine, during an antenna determination process, which of multiple antennas to select for receipt of RF signals for a given packet communication.

As shown, in addition to providing switch control signals to antenna switch 110, antenna diversity control circuit 160 further provides an indication of packet detection to downstream processing circuitry. Understand while shown at this high level in the embodiment of FIG. 1, many variations and alternatives are possible.

Figure 2:
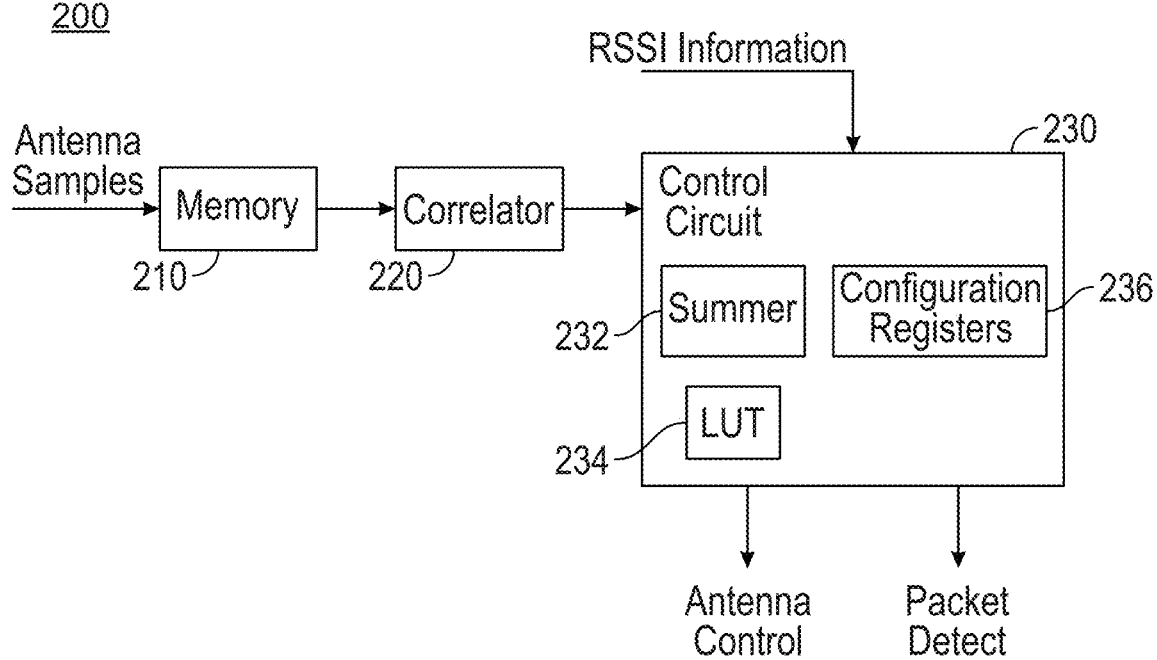
FIG. 2 is a block diagram of an antenna diversity control circuit in accordance with an embodiment.

Referring now to FIG. 2, shown is a block diagram of an antenna diversity control circuit in accordance with an embodiment. As shown in FIG. 2, control circuit 200 may be implemented as a hardware circuit of a wireless receiver. In other situations, the control circuit may be implemented in combinations of hardware circuitry, firmware and/or software.

As illustrated, control circuit 200 receives incoming antenna samples within a memory 210. In embodiments, these samples may be portions of symbols obtained from RF signals received from multiple antennas. In an embodiment, memory 210 may be implemented as a correlator buffer, e.g., in the form of random access memory. In some cases, memory 210 may be partitioned into two separate partitions, a first partition configured to store incoming samples from a first antenna, and a second partition configured to store incoming samples from a second antenna.

Still with reference to FIG. 2, sub-symbol portions of multiple symbols received from each antenna may be provided to a correlator 220, which is implemented as a multi-symbol correlator. In a particular embodiment, correlator 220 may be configured to perform correlations on selected chips of multiple symbols from a given antenna and a predetermined value, namely an expected preamble value. In some cases this expected preamble value may further include information regarding one or more sync words. In any event, correlator 220 is configured to perform a correlation between information from multiple symbols (e.g., three symbols) obtained from a given antenna and this predetermined value to generate a correlation result.

Still with reference to FIG. 2, this correlation result is provided to an internal control circuit 230. As seen, internal control circuit 230 includes various hardware components, including a summer 232, a lookup table 234, and a set of configuration registers 236. Various configuration information for use in performing antenna diversity selection such as antenna selection patterns, chip blanking and offset information may be stored in configuration registers 236. In an embodiment, summer 232 may be configured to calculate a weighted sum between an incoming correlation result and corresponding RSSI information received in internal control circuit 230. In some cases, the coefficients or weights for this sum may be obtained from lookup table 234. In an embodiment, the coefficients and the weights may be selected from the LUT based on correlation results and RSSI information. For example, when the RSSI information is very strong, the correlator information may be weighted greater than at sensitivity levels. As such, for each multi-symbol block from a given antenna, summer 232 determines a weighted sum value.

With multiple weighted sums from the different antennas, control circuit 230 may be configured to determine whether a valid packet has been detected. In response to valid packet detection, control circuit 230 may select an appropriate antenna to use for at least one packet communication. In addition, control circuit 230 may send a packet detect signal to downstream portions of a receiver (e.g., a demodulator). Note that at least some of the antenna samples also may be sent downstream for processing. In addition, control circuit 230 also sends an antenna switch control signal to an antenna switch, to cause switching of an input into the wireless receiver from a selected one of multiple antennas. Although shown at this high level in the embodiment of FIG. 2, many variations and alternatives are possible.

Figure 3:
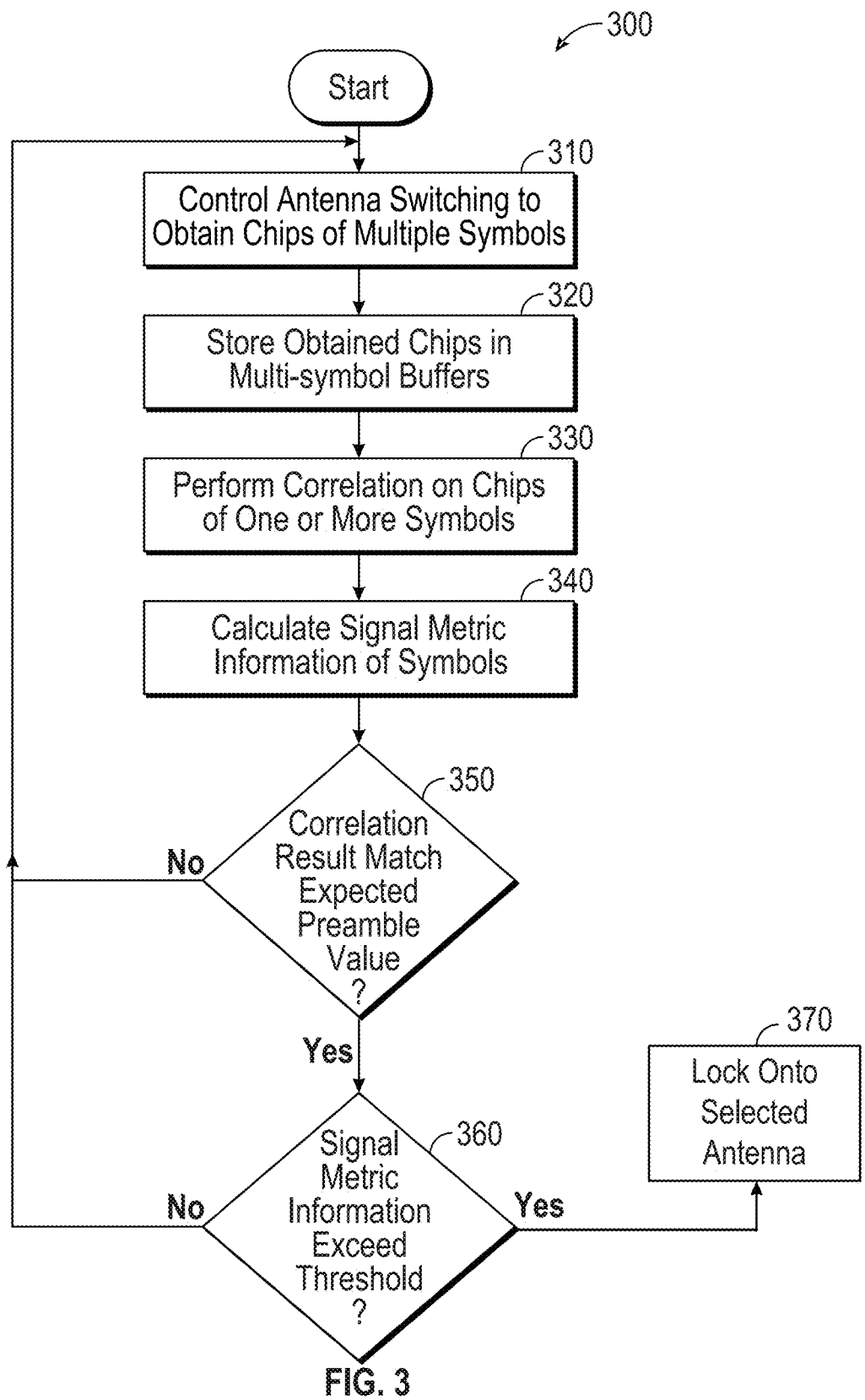
FIG. 3 is a flow diagram of a method in accordance with an embodiment.

Referring now to FIG. 3, shown is a flow diagram of a method in accordance with an embodiment. As shown in FIG. 3, method 300 is a high level method for performing antenna switching to identify the most appropriate antenna for use in receiving a packet communication. In an embodiment, method 300 may be performed by an antenna diversity control circuit such as described above in FIG. 2. In other embodiments, method 300 may be performed by combinations of hardware circuitry, firmware and/or software. As illustrated, method 300 begins by controlling antenna switching to obtain chips of multiple symbols (block 310). More specifically, the control circuit may send antenna switch control signals to an antenna switch to cause it to switch input between multiple, e.g., two, antennas on an antenna slot basis. In an embodiment, each antenna slot may be shorter than one symbol period. For example, in Zigbee a symbol includes 32 chips (each of 500 nanoseconds) with a symbol period time of 16 microseconds.

After incoming symbols are processed within the receiver, they may be stored in corresponding multi-symbol buffers (block 320). For example, the first buffer may be associated with a first antenna to store obtained chips of multiple symbols from the first antenna, and similarly the second buffer may be associated with a second antenna to store obtained chips of multiple symbols from the second antenna.

Next at block 330 a correlation may be performed on the chips of one or more symbols. More specifically in a particular embodiment, contiguous chips of 3 symbols may be correlated with a corresponding predetermined preamble value to obtain a correlation result. Of course, sub-symbol portions of more or less than three symbols may be combined in other embodiments. In an embodiment, correlations may be performed on both in-phase and quadrature phases of an incoming signal, to avoid carrier frequency offset in a complex receiver implementation. In an alternate embodiment, phase information from a CORDIC engine may be correlated. As further shown, signal metric information of the received symbols may be calculated at block 340. More specifically an RSSI circuit may determine RSSI information for incoming samples and provide it to the control circuit.

Still referring to FIG. 3, at diamond 350 it is determined whether the correlation result matches the expected preamble value. This determination may be based on the correlation result, e.g., by an indication of peak values occurring at an expected interval, e.g., every 32 chips.

If the correlation result matches, control next passes to diamond 360 to determine whether the signal metric information (e.g., RSSI information) exceeds a given threshold. If so, control passes to block 370 where timing is identified and an antenna lock may be performed to lock onto a selected one of the antennas for a given packet communication, based at least in part on the correlation result and signal metric information. In this lock condition, an internal state machine of the antenna diversity control circuit enters into a timing state. Otherwise if the correlation result is not as expected or signal metric information does not exceed the threshold, no timing is identified and control passes back to block 310, discussed above.

In some cases, there may be a comparison performed between correlation results and/or signal metric information obtained from the two different antennas to determine a most appropriate antenna for selection. In other cases, a first antenna from which timing is identified based on correlation result and/or signal metric information may be selected, to reduce latency of the antenna diversity determination process.

Understand that even after locking onto a given antenna, the lock may be aborted. For example, an antenna lock state may be aborted as a result of an abort condition, such as a result of a false detection and/or a wrong antenna selection. That is, an abort condition may be as a result of a false detection in which a detection determination was incorrect, which causes a return of the internal state machine to a default search mode (an initial state of the state machine). Another abort condition may be as a result of a true detection that was in progress but a wrong antenna was selected. In this situation, the other antenna may be re-selected without proceeding to the default initial search mode state of the internal state machine.

Abort conditions may thus occur due to improper sequencing, such as a missing symbol that occurs where a symbol should have been present but was not. In this case, control proceeds back to the initial state of the internal state machine. Another abort condition may be as a result of a gap in an otherwise valid sequence, which again causes a reversion back to the initial state of the internal state machine. A further abort condition may be as a result of a spurious symbol in which a peak for a given window is on a different correlator such that a valid but unexpected symbol is received. Again control proceeds in this operation back to the initial state of the internal state machine. While shown at this high level in the embodiment of FIG. 3, many variations and alternatives are possible.

Figure 4:
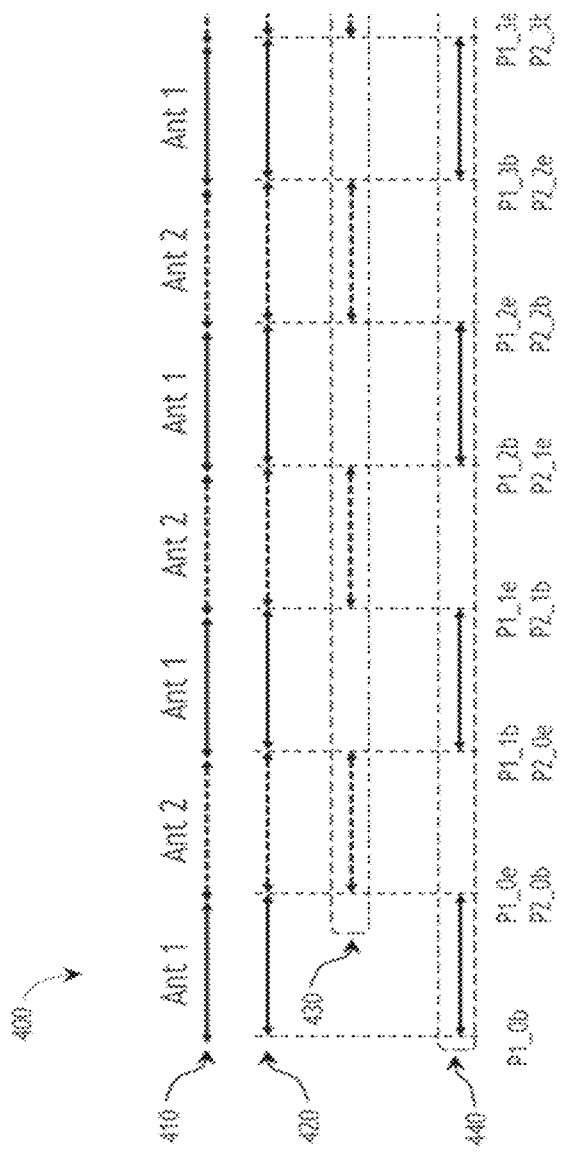
FIG. 4 is a timing diagram illustrating control of antenna switching performed in an antenna diversity process in accordance with an embodiment.

Referring now to FIG. 4, shown is a timing diagram illustrating control of antenna switching performed in an antenna diversity process in accordance with an embodiment. As shown in FIG. 4, timing diagram 400 illustrates a plurality of antenna slots 410, with each antenna slot corresponding to a time duration for which an antenna switch controls passing of incoming RF signals from a given one of two antennas (ANT 1 and ANT 2). As seen, an alternating selection of each antenna occurs for a plurality of antenna slots. Note that due to timing constraints and transients, a slight delay inheres between the actual switching control of the antennas as shown at antenna slots 410 and incoming processed symbols at time instants 420.

Information from three slots is obtained from each antenna, as illustrated at time durations 430 and 440. Information from these different slots may be provided for storage in multi-symbol buffers. To this end, the information may be stored in a given memory location, and corresponding pointers to the beginning and ending of each antenna slot portion of a symbol can be placed into a descriptor list.

As illustrated in FIG. 4, pointers for antenna slots are shown. Specifically, for antenna slots from the first antenna a first set of pointers P1_0-3 are shown with beginning (b) and end (e) indicators for the beginning and end locations of the respective symbols. These pointers provide respective beginning and end locations for storage of symbol information from four antenna slots. And similarly, for antenna slots from the second antenna a second set of pointers P2_0-3 are shown with beginning (b) and end (e) indicators for the beginning and end locations of the respective symbols. In another embodiment, information of these antenna slots may be copied to a separate correlator memory. In an embodiment, the multi-symbol correlators may be run on the correlator buffers each time data is added to the buffers.

Note further that based on configuration of an antenna diversity control circuit, certain portions of the symbols may be masked or blacked out, and offsets additionally may be provided. In a particular embodiment, a useful duration of each symbol may be 26 chips, rather than the full 32 chips of the symbol. In addition, control of chip selection may be programmable.

In an embodiment, an offset may be set at zero and a three-chip blackout may be programmed to remove or eliminate transients. With this arrangement, sequences of chips for each antenna are contiguous, albeit from multiple symbols. Note that particular settings of offset values and blackout values may be stored. In an embodiment, multiple pairs of these values may be stored in a storage such as a lookup table and controlled, e.g., based on configuration of a receiver, to provide a selected pair to control handling incoming RF signals from the different antennas.

Figure 5:
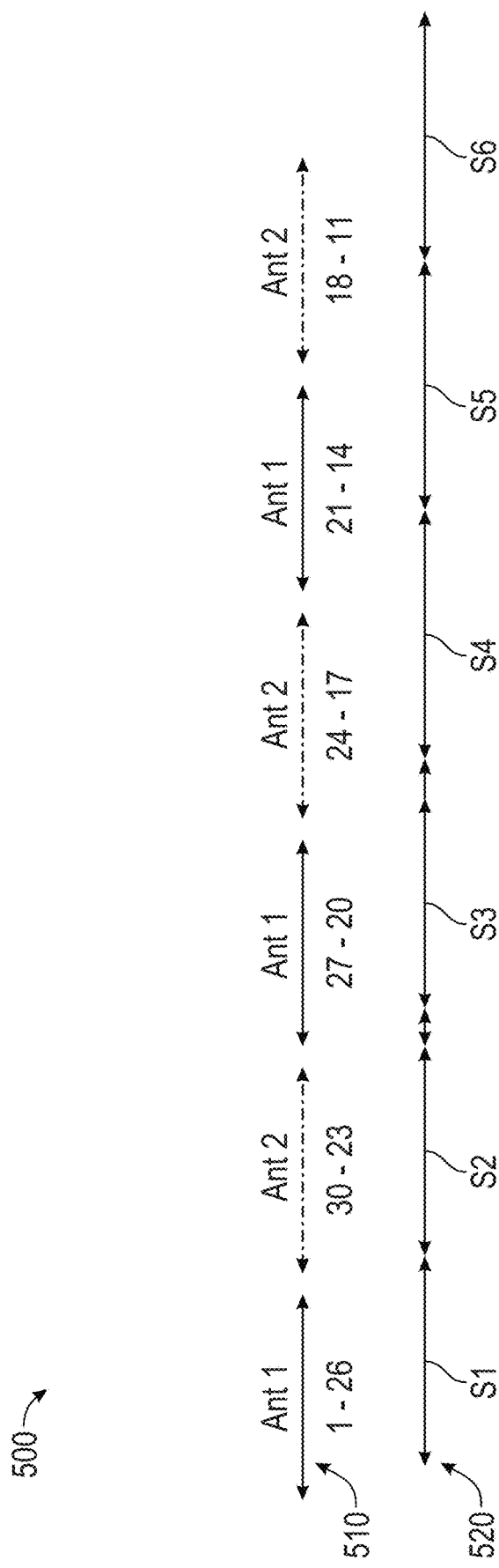
FIG. 5 is a timing diagram illustrating selected chip sequences for two antennas in accordance with an embodiment.

Referring now to FIG. 5, shown is a timing diagram illustrating selected chip sequences for two antennas in accordance with an embodiment. In the timing diagram of FIG. 5, selected chip sequences for the two antennas are shown. As illustrated, for antenna 1 the chip sequence is: 1-26; 27-20; and 21-14 (and note that these chips are contiguous and present in three different symbols). And similarly for antenna 2, the chip sequence is: 30-23; 24-17; and 18-11 (and note that these chips are contiguous and present in three different symbols). Thus as shown in FIG. 5, for a time duration 520 in which six antenna slots S1-S6 are present, antenna switching may be performed during time duration 510 in which the various chips are obtained in sequence from the different antennas. Of course in different implementations different offsets and blackouts may be used, as chip selection is fully programmable. Understand while shown with this particular example in FIG. 5, many variations and alternatives are possible.

Figure 6:
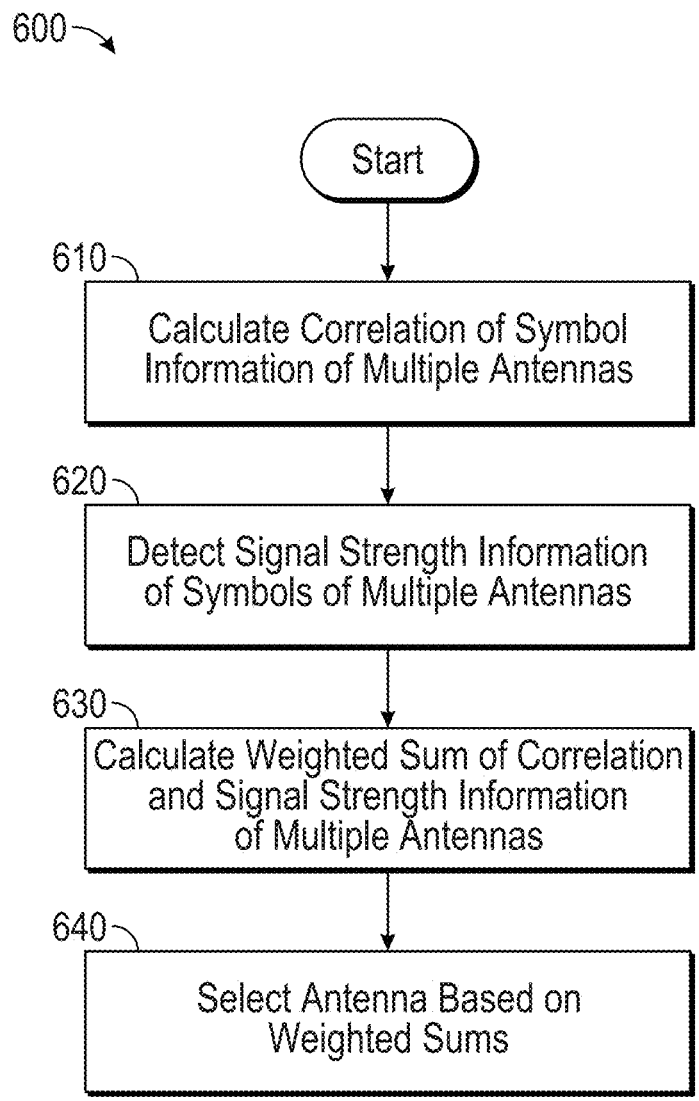
FIG. 6 is a flow diagram of a method in accordance with another embodiment.

Referring now to FIG. 6, shown is a flow diagram of a method in accordance with another embodiment. As shown in FIG. 6, method 600 may be performed by an antenna diversity control circuit, such as described above in FIG. 2, to perform an antenna selection process. In other embodiments, method 600 may be performed by combinations of hardware circuitry, firmware and/or software. As illustrated, method 600 begins by calculating a correlation of symbol information of multiple antennas (block 610). More specifically, a continuous sequence of chips from multiple symbols of a given antenna can be obtained and correlated with an expected preamble value to determine a correlation result. Such operation may proceed iteratively for multiple antennas and multiple antenna slots, such that multi-symbol correlation results may be obtained based on information from multiple symbols. Such correlation results may be calculated in a given multi-symbol correlator of an antenna diversity control circuit. Understand that in some embodiments incoming data to the correlators may be digitally scaled and normalized to a predetermined bit width.

Still with reference to FIG. 6, at block 620 signal strength information may be determined for these symbols from the multiple antennas. Understand while shown in a linear fashion for the discussion, this signal strength information determination, which may be performed in a separate hardware RSSI circuit, may proceed in parallel with the processing of symbols within the antenna diversity control circuit.

In any case, at block 630 a weighted sum may be calculated. More specifically for each antenna a weighted sum may be calculated that combines one or more correlation results and signal strength information. Depending upon the actual values of the correlation results and/or signal strength information, different weightings may be used. Finally, at block 640 the control circuit makes a selection of antenna based at least in part on the weighted sums. For example, an antenna associated with a higher weighted sum may be selected as the antenna for use for a given packet communication. Although shown at this high level in the embodiment of FIG. 6, many variations and alternatives are possible.

Figure 7:
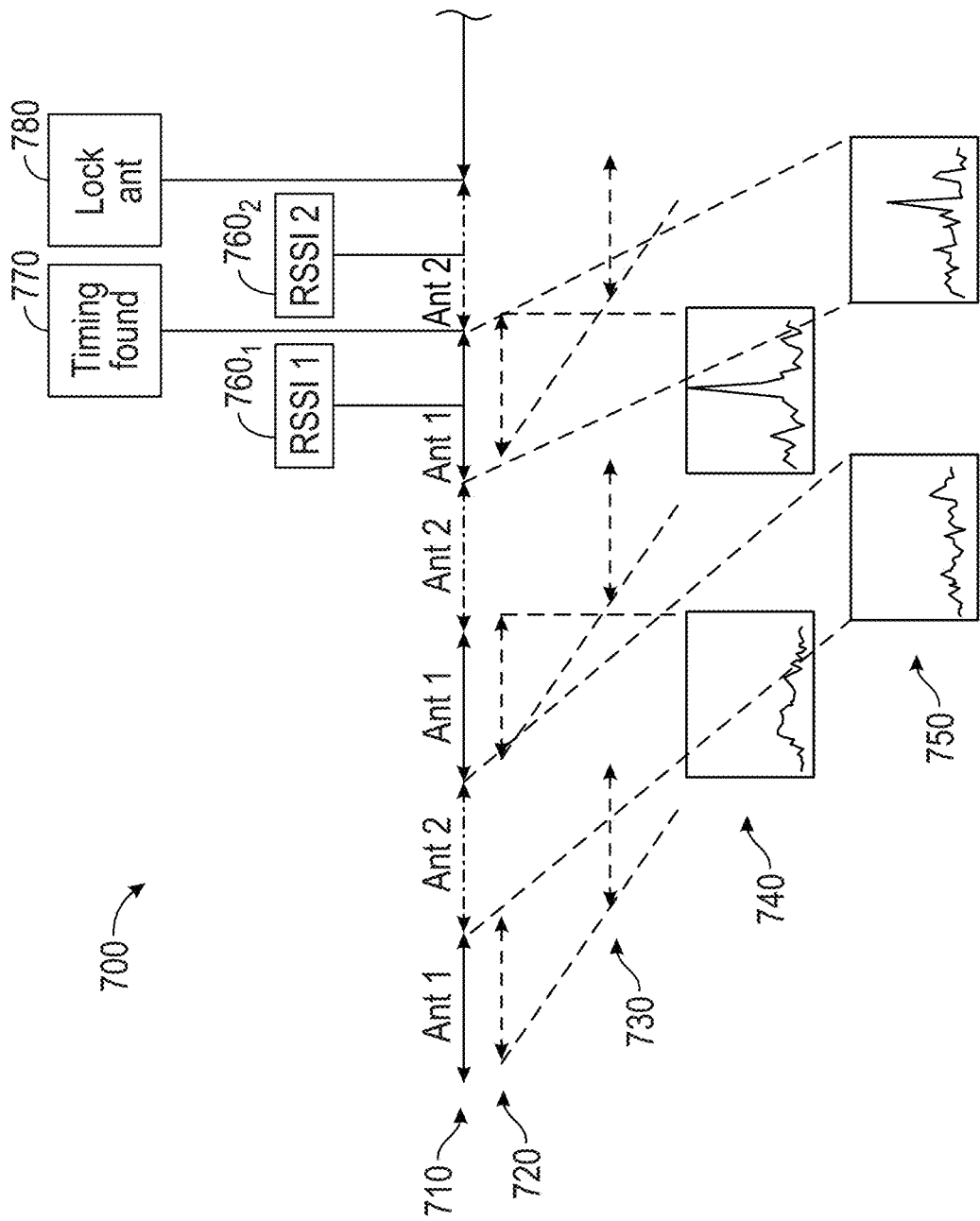
FIG. 7 is a timing sequence for an antenna diversity selection process in accordance with an embodiment.

Referring now to FIG. 7, shown is a timing sequence for an antenna diversity selection process in accordance with an embodiment. As shown in FIG. 7, timing illustration 700 occurs when a control circuit identifies valid timing and locks to an antenna in a most time efficient manner during an antenna diversity determination process. Specifically, FIG. 7 shows a process in which antennas are controlled to switch every slot. As such, for each antenna slot information obtained from a given antenna is provided to the signal processing path of the receiver.

After 3 symbols' worth of information is obtained from a first antenna (as shown at item 720), multiple correlation results, shown at item 740, may begin to be obtained. And as seen, a second correlation result of these multiple correlation results (obtained from information of multiple symbols and as determined in a multi-symbol correlator) has a clear peak, and for which corresponding RSSI information 7601 is of at least a threshold level. This correlator threshold may be both absolute and relative to signal strength, in an embodiment. The correlator threshold also may be programmable such that different thresholds may be used for different levels of signal power. As a result of the correlation result and RSSI information, valid timing is found at time instant 770. Accordingly, an antenna lock event occurs at time instant 780. To this end, an antenna diversity control circuit sends a control signal to an antenna switch to cause it to control the first antenna to provide incoming RF information for a packet communication.

Note that in this implementation, even though correlation results are obtained from the second antenna as shown at item 750 and corresponding RSSI information 7602 also is obtained, the determination is made to use the first antenna based on comparison between the information obtained from the two antennas. Note it is also possible to select a first antenna for which suitable correlation information is obtained, leading to a fastest antenna lock state.

Figure 8:
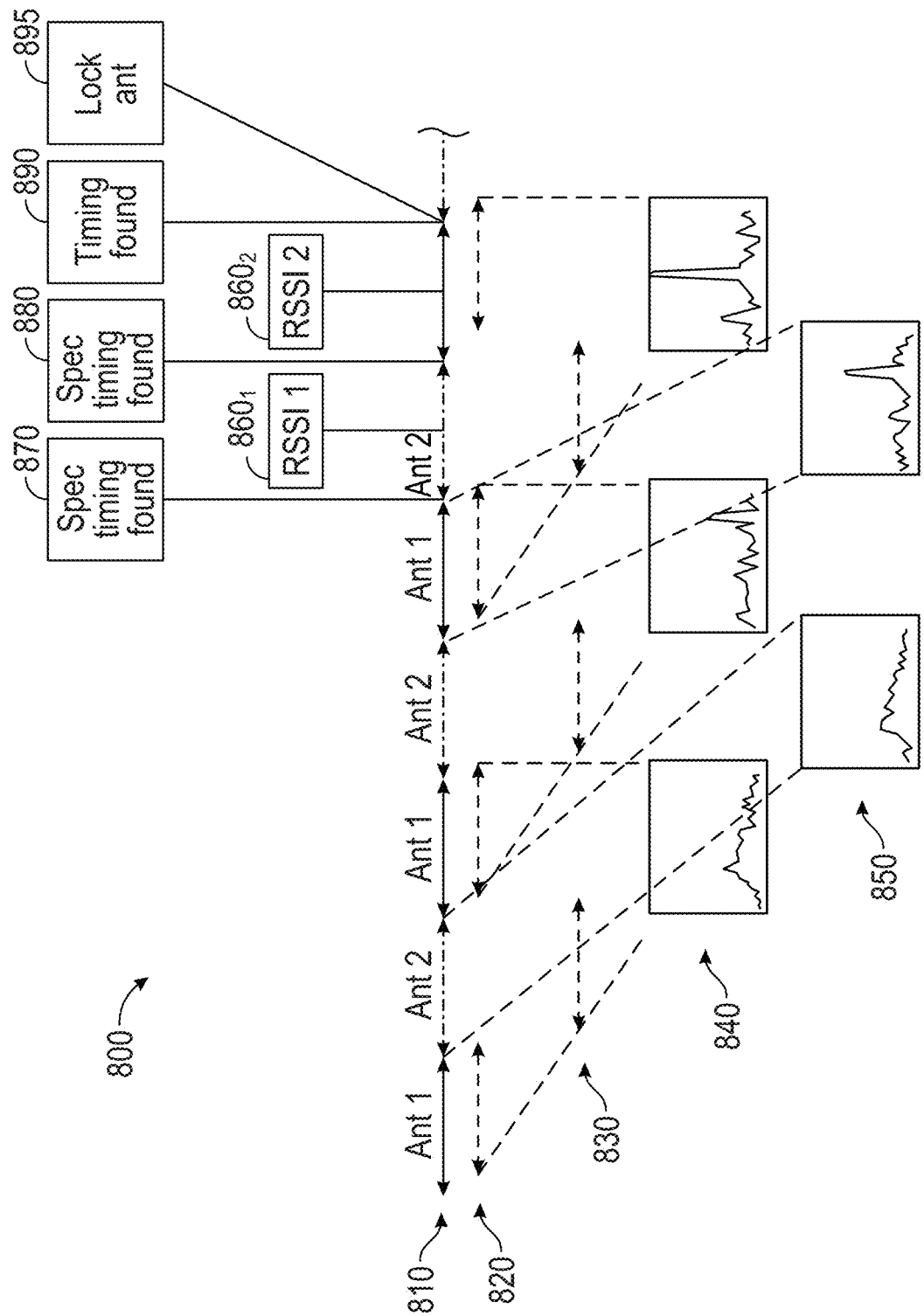
FIG. 8 is a timing sequence for an antenna diversity selection process in accordance with another scenario.

Referring now to FIG. 8, shown is a timing sequence for an antenna diversity selection process in accordance with a different scenario. As shown in FIG. 8, timing illustration 800 occurs when a control circuit iterates through a speculative timing state before identifying valid timing and locking to an antenna. Such speculative state may occur where correlator results are of a lower value, and it can be expected to find timing within a few antenna slots. Specifically, FIG. 8 shows a process in which antennas are controlled to switch every slot, as described above. After 3 symbols' worth of information is obtained from a first antenna (as shown at item 820), multiple correlation results, shown at item 840, may begin to be obtained. At the point of a second correlation result of these multiple correlation results (obtained from information of multiple symbols and as determined in a multi-symbol correlator) there is no clear peak, and corresponding RSSI information 8601 is lower than a first threshold level but higher than a second threshold level. As such, a speculative timing is found at time instant 870. Note that as a result of this finding of speculative timing, the state of both antennas is checked. And at time instant 880, speculative timing is again found and thus the control circuit remains in the speculative state. At time instant 890 timing is found and thus the receiver enters into a decode state.

More specifically, after a third correlation result has a clear peak and a corresponding RSSI level 8602 exceeds a higher threshold, timing is found at time instant 890 and an antenna lock event occurs at time instant 895. As such, an antenna diversity control circuit sends a control signal to an antenna switch to cause it to control the first antenna to provide incoming RF information for a packet communication. Understand that if no timing is found at either of time instants 880 and 890, control may return to the initial state of the control circuit.

Figure 9:
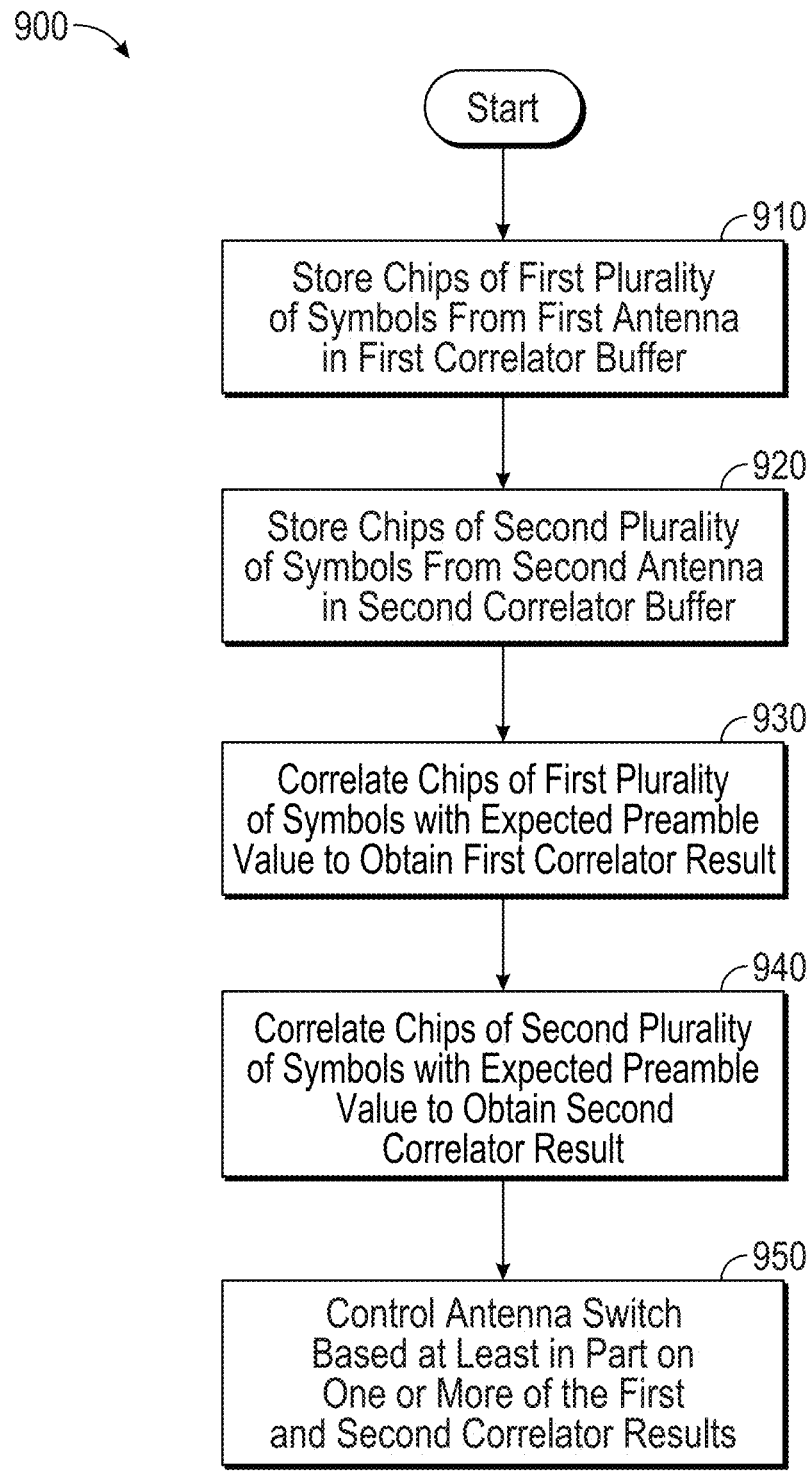
FIG. 9 is a flow diagram of a method in accordance with yet another embodiment.

Referring now to FIG. 9, shown is a flow diagram of a method in accordance with yet another embodiment. More specifically, method 900 of FIG. 9 is another method for performing an antenna diversity selection process to identify a best antenna. Method 900 may be performed by an antenna diversity control circuit, such as described above in FIG. 2, to perform an antenna selection process. In other embodiments, method 900 may be performed by combinations of hardware circuitry, firmware and/or software.

As shown in FIG. 9, method 900 begins by storing chips of a first plurality of symbols from a first antenna in a first correlation buffer (block 910). More specifically, a contiguous set of chips from multiple symbols (each of a different antenna slot, from the same antenna) may be stored. Also note that as described herein, certain chips of particular symbols may be masked or ignored according to masking and/or offset information. A similar process to store chips of a second plurality of symbols from another antenna in a second correlator buffer also may occur (block 920). Next at block 930, the chips of the first plurality of symbols may be correlated with an expected preamble value to obtain a first correlator result. As discussed above, a multi-symbol correlator may be used to perform this correlation process. Similarly, at block 940, the chips of the second plurality of symbols may be correlated with an expected preamble value to obtain a second correlator result using a multi-symbol correlator.

As further shown in FIG. 9, the antenna switch may be controlled for a given packet communication based at least in part on one or more of these first and second correlator results (block 940). In some cases, a first correlation result that exceeds a threshold level may be selected. Accordingly, the antenna associated with that correlation result may be selected, by communicating a control signal to the antenna switch to cause it to pass RF signals from this antenna. In another embodiment, additional signal metric information and comparisons between the correlator results from the different antennas may be analyzed to identify the best antenna. Understand while shown at this high level in the embodiment of FIG. 9, many variations and alternatives are possible.

Figure 10:
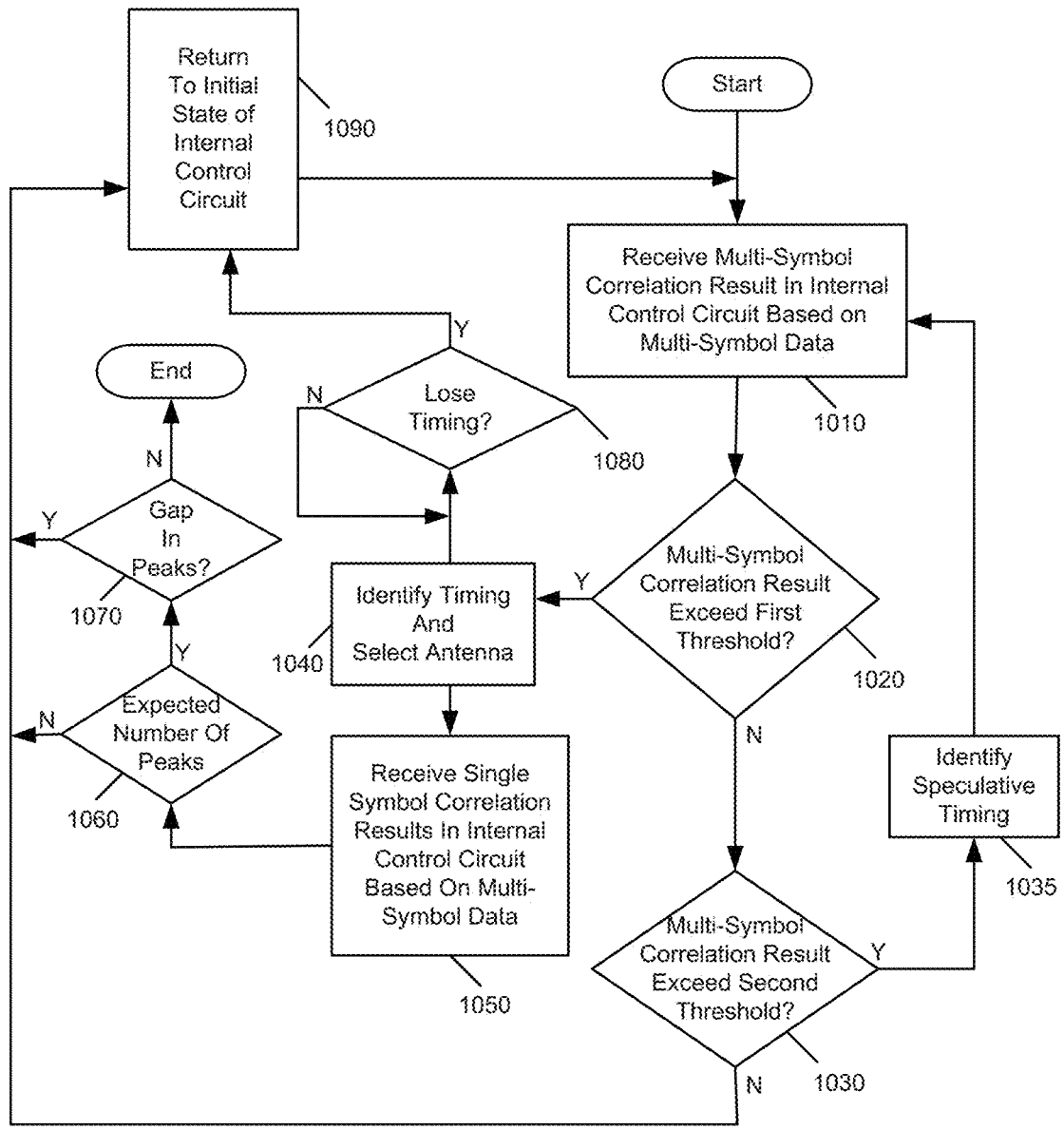
FIG. 10 is a flow diagram of a method in accordance with another embodiment.

Referring now to FIG. 10, shown is a flow diagram of a method in accordance with another embodiment. As shown method 1000 is a method for handling abort conditions during antenna diversity operation of a receiver. Method 1000 may be performed by an antenna diversity control circuit, such as described above in FIG. 2, to perform an antenna selection process. In other embodiments, method 1000 may be performed by combinations of hardware circuitry, firmware and/or software.

As illustrated, method 1000 begins by receiving multi-symbol correlation results in an internal control circuit (block 1010). In an embodiment, this internal control circuit may be located within an antenna diversity control circuit. More specifically, these correlation results are based on multi-symbol data (namely contiguous chips of different symbols). Based at least in part on this correlation result it can be determined whether the correlation result exceeds a threshold (block 1020). This first threshold may be a higher one of multiple thresholds that are used in the antenna diversity process.

If it is determined that the multi-symbol correlation result exceeds this higher first threshold, control passes to block 1040 where timing is identified and the internal control circuit enters into a timing state and a given antenna is selected. At this point, the antenna switch locks onto the selected antenna. And in this situation, incoming symbols are processed accordingly. During such symbol processing it may be determined whether timing is lost, e.g., based on packet decode status and/or continued correlation information from the multi-symbol correlator (diamond 1080). If it is determined that timing is lost, control passes to block 1090 where a state machine of the internal control circuit may return to an initial state, in which further processing of information of incoming antenna slots occurs to enable passing of the state machine to a timing state (either timing or speculative timing).

Still with reference to FIG. 10, if the multi-symbol correlation result does not exceed the first threshold, control passes to diamond 1030, where it is determined whether the multi-symbol correlation result exceeds a second threshold. This second threshold may be a lower one of the multiple thresholds used in the antenna diversity process. If so, control passes to block 1035 where speculative timing may be identified such that the internal control circuit enters into the speculative state. At this point, control passes back to block 1010 for further receipt and processing of multi-symbol correlation results to attempt to lock onto a given antenna.

Still with reference to FIG. 10, note that in parallel with a determination of timing loss, the internal control circuit also may receive single symbol correlation results based on multi-symbol data (block 1050). With this single symbol correlation information, control passes to diamond 1060, where it is determined if the single symbol correlation results include an expected number of peaks. Although embodiments are not limited in this regard, in an embodiment this predetermined number of peaks may be at least two. If this number of peaks is not present in the correlation results, control passes to block 1090 for return to the initial state of the state machine. More particularly in an embodiment, a single peak may be found at the end of the correlation window during a first time, in which case a second peak is expected to be present after the next slot of data is captured. In other words a number of peaks may be found that is equal or greater than the iteration number.

Otherwise, when the single symbol correlation results include the expected number of peaks, control passes to diamond 1070 to determine whether there are any gaps in the peaks. That is, for correct timing identification, peaks may be located at a predetermined interval, e.g., every 32 chips. If there are gaps of a different span in the peaks, control passes to block 1090, to return to the initial state of the internal control circuit state machine. Otherwise if it is determined that there are no gaps in peaks, valid timing is thus identified and no further antenna diversity operations occur for a given packet communication. As another scenario, if correct peaks are identified but there are large spurious peaks (e.g., greater than the main peaks), an abort may occur. Understand while shown at this high level in the embodiment of FIG. 10, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an antenna switch to receive a first radio frequency (RF) signal from a first antenna and a second RF signal from a second antenna, the antenna switch controllable to output a selected one of the first RF signal and the second RF signal;
an RF circuit to receive and process the first and second RF signals;
at least one mixer to downconvert the first and second RF signals to first and second baseband signals; and
an antenna diversity control circuit to receive sub-symbol portions of a first plurality of symbols of the first baseband signal and sub-symbol portions of a second plurality of symbols of the second baseband signal, and to control the antenna switch to output the selected one of the first RF signal and the second RF signal for a packet communication, based at least in part on the sub-symbol portions of the first plurality of symbols of the first baseband signal comprising a contiguous sequence of chips from the first plurality of symbols and the sub-symbol portions of the second plurality of symbols of the second baseband signal comprising a contiguous sequence of chips from the second plurality of symbols.

2. The apparatus of claim 1, wherein the antenna diversity control circuit comprises a memory to store the sub-symbol portions of the first plurality of symbols of the first baseband signal and the sub-symbol portions of the second plurality of symbols of the second baseband signal.

3. The apparatus of claim 1, wherein the antenna diversity control circuit comprises a configuration register to store configuration information comprising chip masking information and blackout information to identify other sub-symbol portions of the first plurality of symbols to be ignored.

4. The apparatus of claim 3, wherein based at least in part on the chip masking information, the antenna diversity control circuit is to receive the contiguous sequence of chips from the first plurality of symbols comprising a first set of chips from a first symbol and a second set of chips from a second symbol, the first set of chips and the second set of chips each less than a full set of chips of the first symbol and the second symbol.

5. The apparatus of claim 1, wherein the antenna diversity control circuit comprises a multi-symbol correlator to correlate the sub-symbol portions of the first plurality of symbols with a preamble value to output a first correlator result and correlate the sub-symbol portions of the second plurality of symbols with the preamble value to output a second correlator result.

6. The apparatus of claim 5, further comprising a received signal strength indicator (RSSI) circuit to calculate RSSI information of the first baseband signal.

7. The apparatus of claim 6, wherein the antenna diversity control circuit further comprises a summer to generate a sum associated with the first baseband signal based on the first correlator result and the RSSI information.

8. The apparatus of claim 7, wherein the antenna diversity control circuit is to select the first antenna when the sum associated with the first baseband signal is greater than a sum associated with the second baseband signal.

9. The apparatus of claim 7, wherein the summer is to generate a weighted sum associated with the first baseband signal based on the first correlator result and the RSSI information.

10. The apparatus of claim 1, wherein the antenna diversity control circuit is to identify an antenna lock state within at least part of a preamble and sync word portion of the packet communication.

11. A method comprising:
storing sub-symbol portions of a first plurality of symbols formed of a contiguous set of chips of the first plurality of symbols received from a first antenna in a first correlation buffer of a wireless receiver;
storing sub-symbol portions of a second plurality of symbols formed of a contiguous set of chips of the second plurality of symbols received from a second antenna in a second correlation buffer of the wireless receiver;
correlating the sub-symbol portions of the first plurality of symbols with an expected preamble value to obtain a first correlation result;
correlating the sub-symbol portions of the second plurality of symbols with the expected preamble value to obtain a second correlation result; and
controlling an antenna switch of the wireless receiver to provide radio frequency (RF) signals from the first antenna for at least one packet communication, based at least in part on the first correlation result.

12. The method of claim 11, further comprising controlling the antenna switch to provide the RF signals from the first antenna for the at least one packet communication, further based on the second correlation result.

13. The method of claim 11, further comprising forming the contiguous set of chips of the first plurality of symbols comprising a first set of chips from a first symbol of the first plurality of symbols and a second set of chips from a second symbol of the first plurality of symbols.

14. The method of claim 13, wherein the contiguous set of chips of the first plurality of symbols comprises sub-symbol portions of the first plurality of symbols of a preamble of the at least one packet communication.

15. The method of claim 11, further comprising controlling the antenna switch to switch between the first antenna and the second antenna and then to lock onto the first antenna during a preamble portion of the at least one packet communication.

16. The method of claim 15, further comprising aborting the lock onto the first antenna in response to one or more abort conditions.

17. A system comprising:
a first antenna to receive first radio frequency (RF) signals;
a second antenna to receive second RF signals;
an antenna switch to receive the first and second RF signals and controllable to output a selected one of the first RF signals and the second RF signals;
an RF circuit to receive and process the first and second RF signals;
at least one mixer to downconvert the first and second RF signals to first and second baseband signals; and
an antenna diversity control circuit to receive sub-symbol portions comprising a contiguous set of chips of a first plurality of symbols of the first baseband signal and sub-symbol portions comprising a contiguous set of chips of a second plurality of symbols of the second baseband signal, and determine, within a preamble portion of a packet communication, to lock onto the first antenna, based at least in part on a first correlation result obtained from the sub-symbol portions of the first plurality of symbols of the first baseband signal.

18. The system of claim 17, wherein the antenna diversity control circuit comprises a multi-symbol correlator to generate the first correlation result.

19. The system of claim 18, wherein the antenna diversity control circuit further comprises a single symbol correlator to generate single symbol correlation results, wherein the antenna diversity control circuit is to abort the lock onto the first antenna based on the single symbol correlation results.

20. The system of claim 17, wherein the antenna diversity control circuit is to obtain the contiguous set of chips comprising a first set of chips from a first symbol of the first plurality of symbols, a second set of chips from a second symbol of the first plurality of symbols, and a third set of chips from a third symbol of the first plurality of symbols.

* * * * *